US012573319B2

(12) United States Patent
Liebl et al.

(10) Patent No.: US 12,573,319 B2
(45) Date of Patent: Mar. 10, 2026

(54) MULTIFUNCTIONAL LABEL, SYSTEM AND METHOD FOR PRODUCING A MULTIFUNCTIONAL LABEL

(71) Applicant: Schreiner Group GmbH & Co. KG, Oberschleissheim (DE)

(72) Inventors: Christian Liebl, Westbury, NY (US); Paul D'Adamo, Monroe, NY (US); Stefan Krauss, Munich (DE); Thomas Oberle, Munich (DE); Andreas Hofenauer, Germering (DE)

(73) Assignee: Schreiner Group GmbH & Co. KG, Oberschleissheim (DE)

( * ) Notice: Subject to any disclaimer, the term of this patent is extended or adjusted under 35 U.S.C. 154(b) by 0 days.

(21) Appl. No.: 18/730,358

(22) PCT Filed: Dec. 20, 2022

(86) PCT No.: PCT/EP2022/087044
§ 371 (c)(1),
(2) Date: Jul. 19, 2024

(87) PCT Pub. No.: WO2023/138865
PCT Pub. Date: Jul. 27, 2023

(65) Prior Publication Data

US 2025/0078688 A1 Mar. 6, 2025

Related U.S. Application Data

(60) Provisional application No. 63/301,831, filed on Jan. 21, 2022.

(51) Int. Cl.

| | |
|---|---|
| ***G09F 3/02*** | (2006.01) |
| ***G09F 3/03*** | (2006.01) |
| ***G09F 3/10*** | (2006.01) |

(52) U.S. Cl.
CPC .......... *G09F 3/0288* (2013.01); *G09F 3/0305* (2013.01); *G09F 3/10* (2013.01);
(Continued)

(58) Field of Classification Search
None
See application file for complete search history.

(56) References Cited

U.S. PATENT DOCUMENTS

| | | | |
|---|---|---|---|
| 2005/0229450 | A1 | 10/2005 | Larsen et al. |
| 2008/0195077 | A1 | 8/2008 | Anatrini |

(Continued)

FOREIGN PATENT DOCUMENTS

| | | | |
|---|---|---|---|
| EP | 0 679 506 | B1 | 8/2002 |
| EP | 2 289 983 | A1 | 3/2011 |

(Continued)

OTHER PUBLICATIONS

JP2007122066A Machine translation via EPO (Year: 2007).*

(Continued)

*Primary Examiner* — Laura C Powers
(74) *Attorney, Agent, or Firm* — Collard & Roe, P.C.

(57) ABSTRACT

A multifunctional label includes a radiation protection layer which is designed to predeterminedly reduce the transmission of electromagnetic radiation in a given wavelength range. The multifunctional label further includes a gas barrier layer, which is designed to reduce the transmission of a gaseous substance in a predetermined manner. The radiation protection layer and the gas barrier layer are directly or indirectly coupled to each other in the common multifunctional label.

13 Claims, 9 Drawing Sheets

Figure 1:
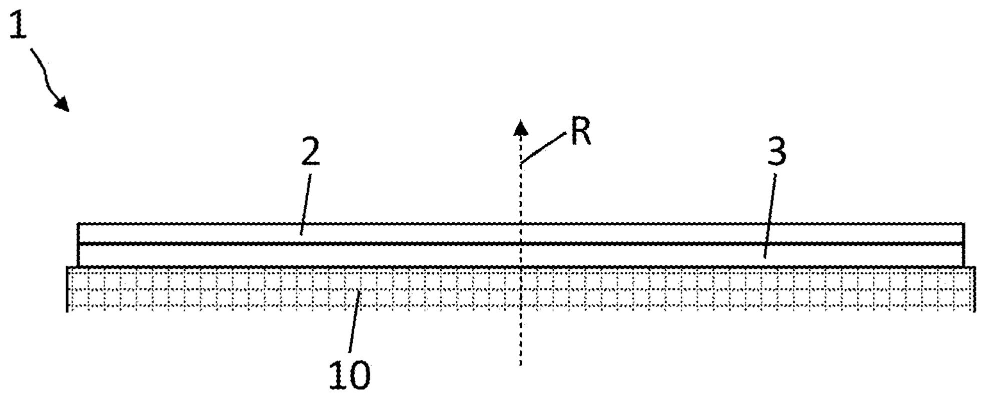

(52) U.S. Cl.
CPC ................ *G09F 2003/0241* (2013.01); *G09F 2003/0257* (2013.01)

(56) References Cited

U.S. PATENT DOCUMENTS

| | | | |
|---|---|---|---|
| 2017/0154548 | A1 | 6/2017 | Krauss et al. |
| 2021/0233433 | A1 | 7/2021 | Miwata |

FOREIGN PATENT DOCUMENTS

| | | | | |
|---|---|---|---|---|
| EP | 2 281 420 | B1 | | 10/2014 |
| EP | 2 078 608 | B1 | | 7/2015 |
| JP | H08-166765 | A | | 6/1996 |
| JP | 2004037623 | A | * | 2/2004 |
| JP | 2007-008590 | A | | 1/2007 |
| JP | 2007-122066 | A | | 5/2007 |
| JP | 4849853 | B2 | | 1/2012 |
| JP | 2019-056864 | A | | 4/2019 |
| WO | 2007/022463 | A2 | | 2/2007 |

OTHER PUBLICATIONS

JP 2004037623A Machine Translation via EPO (Year: 2004).*
International Search Report in PCT/EP2022/087044, mailed Mar. 31, 2023.

* cited by examiner

MULTIFUNCTIONAL LABEL, SYSTEM AND METHOD FOR PRODUCING A MULTIFUNCTIONAL LABEL

CROSS REFERENCE TO RELATED APPLICATIONS

This application is the National Stage of PCT/EP2022/087044 filed on Dec. 20, 2022, which claims priority under 35 U.S.C. § 119 of U.S. Provisional Patent Application Ser. No. 63/301,831 filed on Jan. 21, 2022, the disclosure of which is incorporated by reference. The international application under PCT article 21 (2) was not published in English.

The present invention relates to a multifunctional label which provides reliable and long-lasting protection for the contents of a container in a simple and cost-effective manner. The invention also relates to a system with such a multifunctional label and a method for producing such a multifunctional label.

Labels can be used for authorization or proof of origin and can be used wherever it is necessary to identify or verify objects. Some labels have functions which, for example, enable convenient location and electronic recording of information on the labels and the information provided with them on the basis of electronic components. Labels can also provide visual protection or proof of opening.

It is a task underlying the invention to provide a multifunctional label which can be produced in a simple and cost-effective manner and which provides reliable and long-lasting protection for the contents of a container.

The task is solved by the features of the independent patent claims. Advantageous embodiments are given in the respective dependent claims.

According to an aspect of the invention, a multifunctional label comprises a radiation protection layer which is adapted to predeterminedly reduce a transmission of electromagnetic radiation in a given wavelength range. The multifunctional label further comprises a gas barrier layer which is adapted to reduce a transmission of a gaseous substance in a predetermined manner. The radiation protection layer and the gas barrier layer are directly or indirectly coupled to each other in the common multifunctional label.

The multifunctional label described can be used to provide reliable and long-lasting protection for pharmaceutical products in a simple and cost-effective way. The electromagnetic radiation that is to be prevented from passing through the multifunctional label by means of the radiation protection layer is to be arranged in the ultraviolet and/or visible spectral range. The gaseous substance that is to be prevented from passing through the multifunctional label by means of the gas barrier layer can relate to a pure gas, such as oxygen, and/or to a gas mixture, such as air or water vapor. Alternatively or additionally, the gas barrier layer can be designed to prevent or reduce the passage of ethylene oxide, hydrogen peroxide and/or nitrogen dioxide.

The radiation protection layer can, for example, comprise a film element that predeterminedly reduces the transmission of ultraviolet radiation and/or visible light. The gas barrier layer can be formed, for example, by vapor deposition and/or printing on the film element of the radiation protection layer. Alternatively or additionally, the gas barrier layer is formed on a further film element or another carrier element.

Alternatively or additionally, the radiation protection layer may comprise a layer of lacquer which predeterminedly reduces the transmission of ultraviolet radiation and/or visible light. For example, a yellow lacquer layer can be printed or applied to a carrier element in order to absorb blue light in the 350-450 nm range or to prevent or at least reduce the transmission of blue light through the multifunctional label. The ultraviolet radiation that is to be prevented from passing through has a wavelength in the range of 250-350 nm, for example.

The gas barrier layer comprises, for example, silicon oxide, aluminum and/or aluminum oxide and is designed in particular to predeterminedly reduce the transmission of oxygen or an oxygen-containing gas mixture. Depending on the intended use of the multifunctional label, the gas barrier layer can alternatively or additionally be designed to prevent another or further gaseous substance from being transmitted through the multifunctional label.

According to a further embodiment of the multifunctional label, the radiation protection layer comprises pigments and/or one or more color prints in order to reduce a transmission of a predetermined spectral range of electromagnetic radiation. The pigments are designed to absorb and/or reflect a predetermined amount of ultraviolet radiation. The color print is designed to absorb and/or reflect a predetermined wavelength range of visible light. The spectral range of light visible to humans extends from around 400-800 nm. The color prints can be set up in such a way that they prevent one or more predetermined sections of visible light from being transmitted through the multifunctional label or prevent or at least significantly reduce the broadband transmission of visible light.

The radiation protection layer can, for example, be designed as a foil element with a transparent UV protection film and/or a color print. Alternatively or additionally, the radiation protection layer consists of a transparent film which offers UV protection due to its material properties and/or fillers and is permeable to visible light (e.g. Plexiglas (acrylic glass) film). Alternatively or additionally, a colored film and/or a pigmented film with titanium dioxide can provide the radiation protection layer. Furthermore, the gas barrier layer can be formed on the radiation protection layer by means of printing or other coating processes such as vacuum coating or vapor deposition, so that no additional carrier element is required for the gas barrier layer and the multifunctional label can be produced in a particularly flat and material-saving manner.

The gas barrier layer can, for example, also be designed as a foil element in which silicon oxide is incorporated or which is made of silicon oxide. The film element can be a carrier film on which, for example, a UV coating is applied in order to form the radiation protection layer on the gas barrier layer, so that no additional carrier element is required for the radiation protection layer and the multifunctional label can be produced in a particularly flat and material-saving manner. Alternatively, the radiation protection layer and the gas barrier layer are designed as separate components that are bonded together directly or by means of one or more intermediate layers.

Furthermore, the radiation protection layer and the gas barrier layer may not be designed as foil elements or printed layers but as paper elements or have paper sections. It is also possible for the radiation protection layer and/or the gas barrier to be incorporated in a respective adhesive. For example, predetermined radiation protection materials are stirred into an adhesive and this can be applied to the gas barrier layer or another carrier element as a radiation protection adhesive. The same is also conceivable for the gas barrier layer, which comprises, for example, oxygen and/or water vapor scavengers that are incorporated into an adhesive, which can then be integrated into the multifunctional label as a gas barrier adhesive.

Accordingly, polymer films or papers which are functional in themselves, through ingredients and/or fillers, such as pigments and/or oxygen scavengers, or through coating and/or printing, can be used to form the radiation protection layer and/or the gas barrier layer. Alternatively or additionally, adhesive layers which are functional due to ingredients and/or fillers, such as pigments and/or oxygen scavengers, can be used to form the radiation protection layer and/or the gas barrier layer. Furthermore, in addition to polymer films, paper elements or functionalized adhesive layers, other flat media, such as metal foils, non-woven or woven fabrics, which are functional in themselves or can be functionalized by fillers or coating/printing in order to form or contribute to the radiation protection layer and/or the gas barrier layer, can also be considered.

According to a further embodiment of the multifunctional label, the radiation protection layer and the gas barrier layer are transparent, at least in sections, for a predetermined wavelength range of visible light. In this way, an inspection window can be realized, which enables content inspection when the multifunctional label is attached to a transparent object, such as a syringe. For example, the radiation protection layer and the gas barrier layer can each be formed from film elements, each of which is transparent in a predetermined section. In relation to the surface of a syringe, an unclouded and true-color view of the contents of the syringe can thus be provided through the layers of the multifunctional label in the direction of the surface normal.

Alternatively or additionally, the multifunctional label can have a print layer or coating that is coupled with the radiation protection layer and/or the gas barrier layer. The print layer or coating can be designed in such a way that it only covers the radiation protection layer and/or the gas barrier layer in sections, so that the radiation protection layer and/or the gas barrier layer remain transparent in a predetermined section or are transparent for a predetermined wavelength range of visible light. This also makes it possible to realize an inspection window for optical assessment of the pharmaceutical product or the contents of an object for which the multifunctional label is intended.

The optionally printed or coated radiation protection layer and/or gas barrier layer are attached to each other in particular with adhesives, for example pressure-sensitive adhesives, and/or by means of welding, for example ultrasonic welding, laser welding and/or thermal welding and/or sealing, for example heat sealing or cold sealing, and can be attached to a surface of a container. The layered structure can be achieved by laminating and fixing the respective layers to each other before applying the multifunctional label to the container surface. Alternatively, the layered structure of the multifunctional label can also be realized by wrapping the container with film components, which can consist of part of the desired layered structure.

According to a further embodiment, the multifunctional label has an adhesive layer which is coupled to the radiation protection layer and the gas barrier layer and which is adapted to adhesively couple the multifunctional label to an object. The multifunctional label further comprises an adhesive weakening agent, for example in the form of a siliconized section, which is coupled to the radiation protection layer and/or the gas barrier layer in the region of the adhesive layer. Thus, in relation to a state in which the multifunctional label is applied to the object, the adhesive layer is predeterminedly weakened in sections and the radiation protection layer and/or the gas barrier layer can be lifted off the object in sections and bonded to it again. This means that an inspection window can also be set up for checking the contents.

Alternatively or additionally, the multifunctional label can have an adhesive layer that couples the radiation protection layer to the gas barrier layer. An adhesive weakening agent, which is arranged in the area of the adhesive layer between the radiation protection layer and the gas barrier layer, makes it possible for the adhesive layer to be predetermined weakened in sections and for the radiation protection layer and the gas barrier layer to be detachable from each other in sections and bondable to each other again. An inspection window in the multifunctional label can also be realized in this way. For example, the gas barrier layer is designed as a transparent film element, at least in sections, which faces the object in an applied state. The radiation protection layer would therefore be arranged further out or facing away from the object. Since the gas barrier layer is partially or completely transparent, it is sufficient to fold the radiation protection layer up or away as required in order to carry out an optical visual inspection of the object and its contents through the transparent section of the gas barrier layer.

The described options for forming the inspection window allow an unclouded view into the syringe or into the object to which the multifunctional label is attached. In this way, undesirable discoloration and/or undesirable flocculation of liquid pharmaceuticals can be reliably identified and, if necessary, the medication can be dispensed.

The gas barrier layer is preferably transparent and can comprise a first barrier layer, a second barrier layer and a barrier adhesive layer that adhesively couples the two barrier layers together. Furthermore, the gas barrier layer may comprise one or more print layers and/or coatings that provide readable information and/or provide additional light protection. In addition, the barrier adhesive layer and the adhesive layers described above can each be designed as a pressure-sensitive adhesive layer.

The multifunctional label has, for example, the gas barrier layer with the multilayer structure described above and also comprises a first adhesive layer, which is arranged between the radiation protection layer and the gas barrier layer in relation to a stacking direction of the multifunctional label and bonds them together. The multifunctional label also has a second adhesive layer, which is designed to affix the multifunctional label to an object. The second adhesive layer is arranged on the radiation protection layer or on the gas barrier layer, depending on which of these layers is to face towards or away from the object.

The multifunctional label described is particularly suitable for use on a pharmaceutical container to protect its contents against adverse external influences. This applies, for example, to conventional syringes made of glass or plastic. It is a realization in connection with the present invention that plastic syringes are being used more and more frequently. Compared to glass containers, plastic containers are usually stable with regard to interactions of the contents with a confining wall. In addition, less silicone can be used in plastic syringes than in glass syringes, which is designed to allow a syringe plunger to slide with low resistance within the respective syringe in order to push the contents out of the syringe as required. However, plastic syringes are susceptible to gas interactions or offer little resistance to these when passing through the wall. For example, oxygen and/or UV light can penetrate the syringe and adversely affect the contents so that they cannot be used as intended. The multifunctional label can be used to provide reliable and durable protection against the effects of gas and light, which is particularly suitable for plastic containers, but also for glass containers.

The multifunctional label provides useful combined protection against light and/or UV radiation as well as the effects of oxygen or water vapor. In particular, the multifunctional label can be designed as a stack of layers with a light/UV protective film and a gas barrier film, which are adhesively bonded together. Alternatively or additionally, the light/UV protection layer can also be designed as a print layer. The multifunctional label can also have an inspection window for the visual assessment of a pharmaceutical product. To realize such an inspection window, a transparent area can be integrated into the multifunctional label. Alternatively or additionally, an inspection window can be created in the multifunctional label by partial delamination in the stack of layers or also by delamination of the entire stack of layers from the pharmaceutical container.

In addition, the multifunctional label can also be used to identify the object or container and can, for example, have an RFID transponder with an RFID chip and an antenna structure that are coupled to each other using signal technology. This enables reliable combination protection and useful electronic identification of the object.

Furthermore, the multifunctional label can include security features such as a void layer. The void layer provides a void effect that offers tamper protection. For example, the void layer is realized with two or more differently adhesive structures or release gradations. For example, a more adhesive structure in the form of lettering is implemented in the void structure, while other sections of the void structure are less adhesive. If the void structure or the multifunctional label with a void layer is applied to an object to be labeled, the more adhesive lettering, for example, remains on the object when the multifunctional label is removed, while the weaker adhesive sections are removed with the multifunctional label or a label section that has been detached from the object. Alternatively, the structures described can also be designed in reverse with regard to their adhesive strength, so that, for example, the structure in the form of lettering is less adhesive.

Alternatively or additionally, security features can be provided in the form of punched holes that set up a predetermined weakening structure of a label layer of the multifunctional label. In this way, for example, tearing positions can be provided at which the multifunctional label tears in a predetermined manner when tampering is attempted or when the object to which it is applied is opened. Alternatively or additionally, perforations can also be provided in one or more layers of the multifunctional label, which enable a specific layer to be cut through or torn open.

It is also useful for the multifunctional label to be designed as an all-round or wrap-around label in order to cover as much of the surface of the container as possible, so that the multifunctional label provides as much additional protection as possible. For example, the multifunctional label can also be designed in such a way that, when used on a syringe, it extends over the shoulder of the syringe as far as the cap and closes the resulting sleeve over the cap. In this way, the shoulder and closure area of the syringe or container in general can also be additionally protected against the effects of light/UV radiation and against gas ingress.

According to a further aspect of the invention, a system comprises an embodiment of the multifunctional label described above, which is attached to an object. In particular, a surface of the object can form a substrate for the multifunctional label. The surface of the object can, for example, be provided by an outer surface of a container, in particular by the outer surface of a syringe. Because the system comprises a configuration of the multifunctional label described, properties and features of the multifunctional label are also disclosed for the system and vice versa. For example, the object of the system is realized as an injection vial, vial or syringe and the attached multifunctional label provides a reliable protection for the pharmaceutical product stored therein.

According to a further aspect of the invention, a method for producing a multifunctional label comprises providing a radiation protection layer, for example in the form of a pigmented and/or printed film, which is adapted to predeterminedly reduce a transmission of electromagnetic radiation in a predetermined wavelength range, in particular in the ultraviolet and/or visible spectral range. The method further comprises providing a gas barrier layer, for example in the form of a silicon oxide carrier film with a coating, which is set up to predeterminedly reduce a transmission of a gaseous substance, in particular oxygen. The method also comprises coupling these layers together so that the radiation protection layer and the gas barrier layer are directly or indirectly bonded together in the multifunctional label.

Due to the fact that the respective method is set up in particular for producing an embodiment of the multifunctional label described above, properties and features of the multifunctional label are also disclosed for the manufacturing method and vice versa.

Processing of a large number of multifunctional labels can be carried out in particular in a roll-to-roll process with a pre- and post-run. In this process, material webs for the radiation protection layer and for the gas barrier layer can be provided, processed and coupled together to form a plurality of multifunctional labels on a label roll. Furthermore, punching and/or cutting processes can be carried out, for example to make format and/or functional punchings.

It is a realization in connection with the present invention that pharmaceutical products, in particular biotechnologically produced drugs, are very sensitive to environmental influences such as temperature, light, UV radiation, oxygen, water vapor, mechanical effects, etc., It is therefore necessary to protect pharmaceutical products from these influences. With the multifunctional label, no additional packaging is required and the contents of containers such as syringes, injection vials and vials can be reliably protected. The multifunctional label is a particularly flat and material-saving packaging component, which is preferably designed to cover a large part of the outer surface of the container. The functional layer structure of the multifunctional label can be tailored to relevant and customized protective properties for a particular container.

The multifunctional label provides a useful combination of protection against light, UV radiation and unwanted gas penetration by means of films, prints and/or coatings. In addition to films, prints and/or coatings that provide light/UV protection and a gas barrier, prints and coatings can be applied to provide information or adhesion, for example as pressure-sensitive adhesives and/or to change the surface energy, for example by applying silicone. The films, prints and coatings are preferably arranged in stacked layers. Such a layer stack of the multifunctional label can be easily and reliably glued and/or sealed to the outer surface of a container, such as a polymer syringe, and provides a customized level of protection.

The optionally printed and/or coated films can be bonded together with adhesives, in particular pressure-sensitive adhesives, and/or by thermoplastic welding. Depending on the application, it can be advantageous if the entire layer stack can be partially and reversibly removed or the film layers can be partially and reversibly delaminated, for example to allow an unimpaired and color-fast view into the container. For this purpose, areas without adhesives or areas with modified surface energy, for example by silicone coating, to reduce the adhesion of adhesives or areas with prints or coatings that neutralize adhesives can be introduced into the layer stack. An alternative or additional option for true color inspection is to provide sufficiently transparent areas in the layers of the layer stack so that an inspection window is created.

As soon as the multifunctional label is applied to the surface of the container, the contents of the container are separated from the surroundings by the layer stack and the container material. Therefore, the layer structure of the multifunctional label provides customized protection against UV radiation and/or visible light and also a gas barrier against unwanted passage of a gaseous substance. If the gas barrier layer or a barrier layer is located as close as possible to the container surface, it can also serve as a barrier against monomers and/or oligomers that are released, for example, from printing inks from the outer layers.

The radiation protection layer against ultraviolet radiation can be, for example, a transparent acrylic film or Plexiglas film that is optionally reinforced with functional fillers.

For example, a semi-opaque or opaque printing layer based on printing inks for screen or flexographic printing can be provided as a radiation protection layer against visible light, for example in conjunction with a UV-curing system and/or a water- or solvent-based system. Alternatively or additionally, an opaque or semi-opaque film can be formed, for example comprising one or more pigmented polymers.

For example, a silicon oxide (SiOx), aluminum oxide (Al2O3) and/or aluminum (Al) layer can be used as a gas barrier layer against the passage of oxygen and/or another gaseous substance, which is formed as a film coating on a carrier film. Such a carrier film can, for example, consist of or have a polymer such as polyethylene (PE), polypropylene (PP) and/or polyethylene terephthalate (PET). Alternatively or additionally, an ethylene-vinyl alcohol copolymer (EVOH) layer can be formed by co-extrusion or coating and realize a barrier layer or the gas barrier layer. Furthermore, alternatively or additionally, a film with oxygen and/or water vapor traps can be provided for setting up the gas barrier layer. Furthermore, an oxygen or water vapor absorber layer can alternatively or additionally be provided as a filler or formed by coating in order to establish or co-form the gas barrier layer.

In addition, the multifunctional label can comprise one or more further functional layers that increase dielectric strength. This can be provided, for example, by one or more films made of polyetherimide (PEI), polybutylene terephthalate (PBT) and/or polyimide (PI). Reliable temperature protection can be provided, for example, by one or more films made of PU foams and/or phase change materials, such as kerosenes or salts, which are incorporated into films or provided by coatings. Furthermore, additional mechanical protection can be provided by one or more films made of PU foams.

Through a forward-looking combination of functional layers, for example in the form of films, coatings and/or prints, a label stack of the multifunctional label can be formed that combines reliable protection against several stress factors. In particular, it is possible to combine protection against UV radiation and/or visible light with a barrier against oxygen or water vapor or other gases. The entire layer stack of the multifunctional label can be partially and reversibly removable from the intended object. Alternatively or additionally, predetermined layers of the multifunctional label can be partially and reversibly delaminated in order to allow an unobstructed view into the object for inspection purposes.

Figure 15:
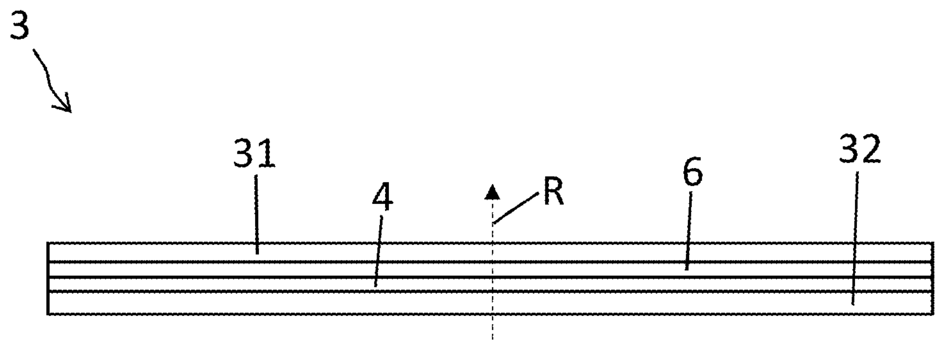
Figure 16:
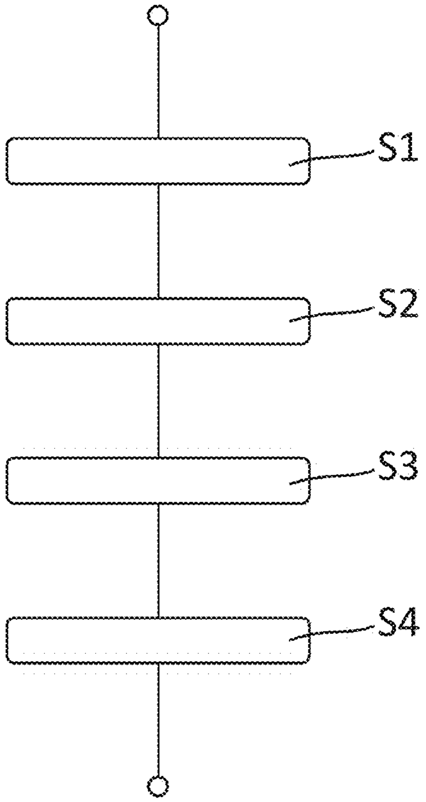

In the following, embodiments of the invention are explained with reference to schematic drawings. They show:

FIGS. 1-15 show various embodiments of a multifunctional label in respective side views, and FIG. 16 a flow chart for a method for producing a multifunctional label according to FIGS. 1-15.

Elements or features of the same construction or function are marked with the same reference signs across the figures. For reasons of clarity, not all of the elements or features shown in all of the figures are marked with the corresponding reference signs, possibly.

FIGS. 1-16 each show a schematic side view of various embodiments of a multifunctional label 1. The multifunctional label 1 has at least one radiation protection layer 2 and at least one gas barrier layer 3, which are directly or indirectly coupled to one another in the common multifunctional label 1. The radiation protection layer 2 is designed to reduce the transmission of electromagnetic radiation in a predetermined wavelength range. In particular, the radiation protection layer 2 is designed to block or at least significantly reduce the transmission of ultraviolet radiation and/or visible light through the multifunctional label 1.

The gas barrier layer 3 is designed to predeterminedly reduce the transmission of a gaseous substance. In particular, the gas barrier layer 3 is designed to block or at least significantly reduce the passage of oxygen or an oxygen-containing gas mixture through the multifunctional label 1.

The multifunctional label 1 can therefore be used in a simple and cost-effective way to provide reliable and durable combination protection against the adverse effects of light and gas for pharmaceutical products that are stored, for example, in an object 10 such as an injection vial, a vial or a syringe. The multifunctional label 1 is suitable for use on a plastic syringe, for example, and can be wrapped around the surface of the syringe as a wrap-around label or wrap-around label. As a pharmaceutical container, the syringe realizes the object 10, the contents of which are protected by the multifunctional label 1 in order to enable its intended use over a long period of time. Preferably, the multifunctional label 1 also comprises an adhesive layer 4, by means of which the multifunctional label 1 can be easily and reliably adhered to the object 10 (see FIG. 2).

Figure 2:
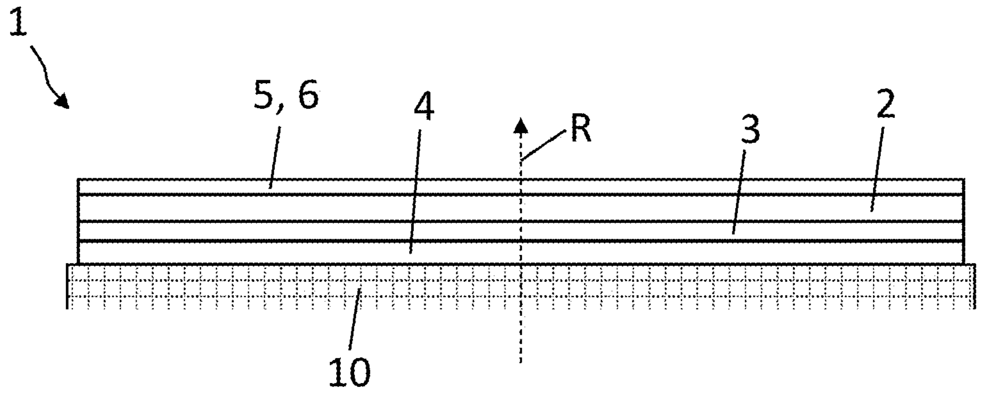

FIG. 2 shows an embodiment of the multifunctional label 1 with a mechanical protective layer 5 and/or a print layer or coating 6, which is or are arranged on the radiation protection layer 2. Referring to a stacking direction R of the multifunctional label 1, the mechanical protective layer 5 and/or the print layer or coating 6 are arranged on the radiation protection layer 2, which in turn is arranged on the gas barrier layer 3, as shown in FIG. 2. The adhesive layer 4, which bonds the multifunctional label 1 to the object 10, is formed below the gas barrier layer 3.

In this description, terms such as "top", "bottom", "upper side", "lower side", "above" and "below" refer to alignments or orientations of the respective elements as illustrated in the figures along the stacking direction R. A respective thickness of the illustrated layers therefore extends along the stacking direction R. The thicknesses of the respective layers of the multifunctional label 1 can be the same or different. The stacking direction R essentially corresponds to a surface normal of the surface of the object 10 to which the multifunctional label 1 is attached.

Figure 3:
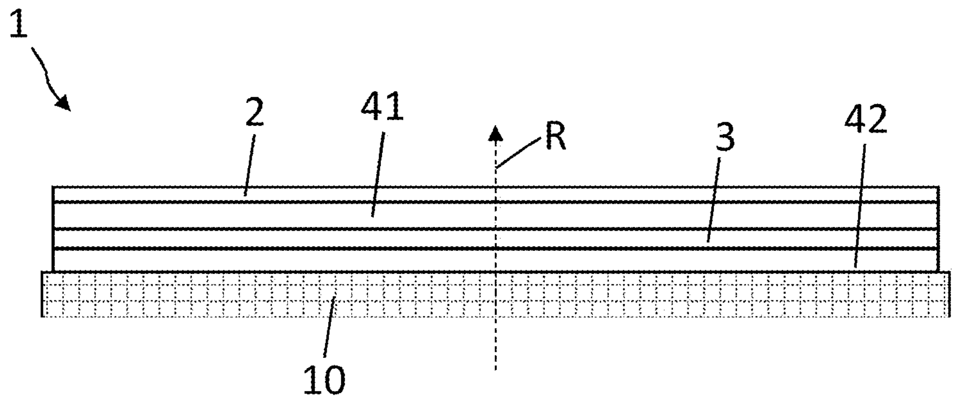
Figure 4:
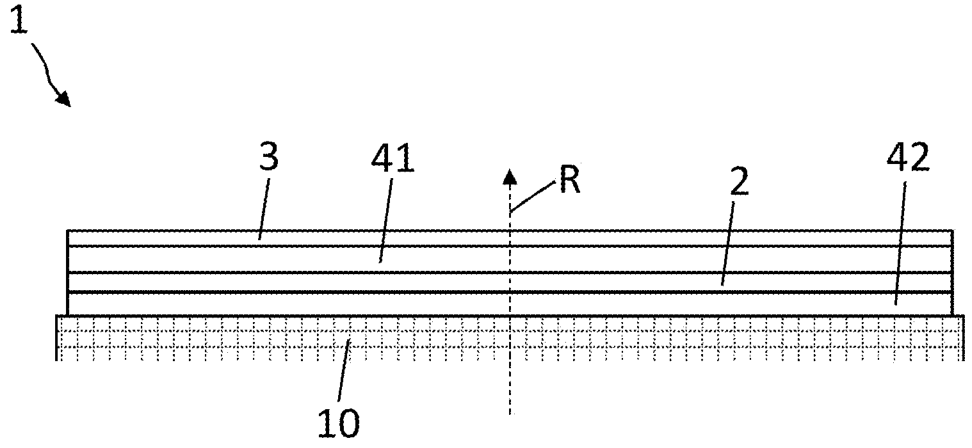

FIGS. 3 and 4 illustrate a particularly simple structure of a layer stack of the multifunctional label 1. The radiation protection layer 2 and the gas barrier layer 3 are each formed as film elements and are adhesively coupled to each other and to the object 10 by means of adhesive layers 41, 42. Radiation protection layer 2 is connected to the gas barrier layer 3 as a UV protection film by means of a first pressure-sensitive adhesive layer 41. FIGS. 3 and 4 show that the positions of the radiation protection layer 2 and the gas barrier layer 3 can vary in relation to the stacking direction R. Combined protection against UV radiation and gas ingress is provided in each case.

According to FIG. 3, the gas barrier layer 3 is arranged between the first adhesive layer 41 and the second adhesive layer 42, while the radiation protection layer 2 is arranged on the outside, facing away from the object 10. Thus, the gas barrier layer 3 is protected against mechanical influences from the outside by the radiation protection layer 2. The gas barrier layer 3 also protects against the migration of gaseous substances, which can be caused by layers located further outside.

According to FIG. 4, the radiation protection layer 2 is arranged between the first adhesive layer 41 and the second adhesive layer 42, while the gas barrier layer 3 is arranged on the outside, facing away from the object 10. Thus, the radiation protection layer 2 is protected against mechanical influences from the outside by the gas barrier layer 3.

Figure 5:
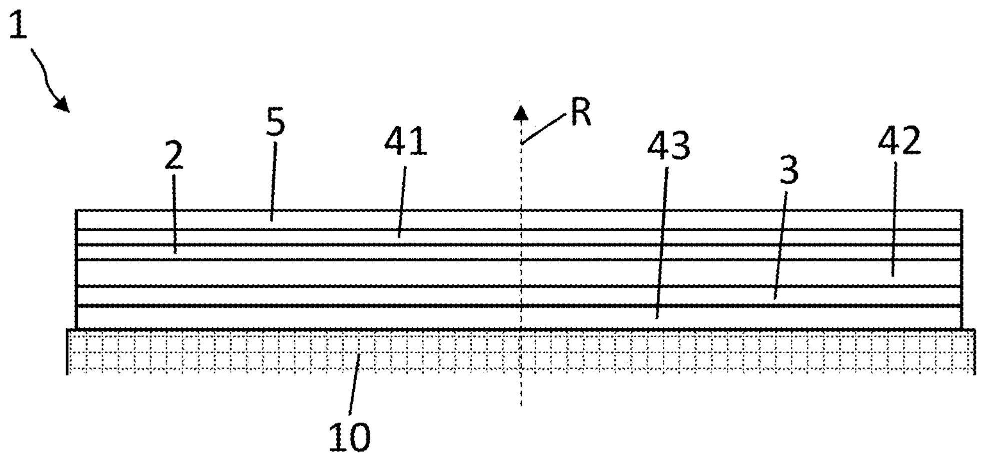

FIG. 5 shows an embodiment of the multifunctional label 1, which has a mechanical protective layer 5 as the uppermost layer. The mechanical protective layer 5 serves to protect the underlying functional layers, in this case the radiation protection layer 2 and the gas barrier layer 3. The mechanical protective layer 5 is preferably, as illustrated in FIG. 5, attached to an outer surface in relation to the surface of the article 10 and can, for example, be formed from a polymer such as polyethylene (PE), polypropylene (PP) and/or polyethylene terephthalate (PET). The mechanical protective layer 5 is bonded to the radiation protection layer 2 by means of the first adhesive layer 41. The radiation protection layer 2 is bonded to the gas barrier layer 3 by means of the second adhesive layer 42. The gas barrier layer 3 is bonded to the surface of the object 10 by means of a third adhesive layer 43. The adhesive layers 41, 42, 43 can be designed as pressure-sensitive adhesive layers.

According to the structure illustrated in FIG. 5, the multifunctional label 1 again provides combined protection against UV radiation and gas ingress, whereby the gas barrier layer 3 also protects against the migration of gaseous substances, which can be caused by layers located further out, and is itself protected against mechanical effects from the outside by the radiation protection layer 2. The mechanical protective layer 5 provides additional protection for the layers underneath against external mechanical influences.

Figure 6:
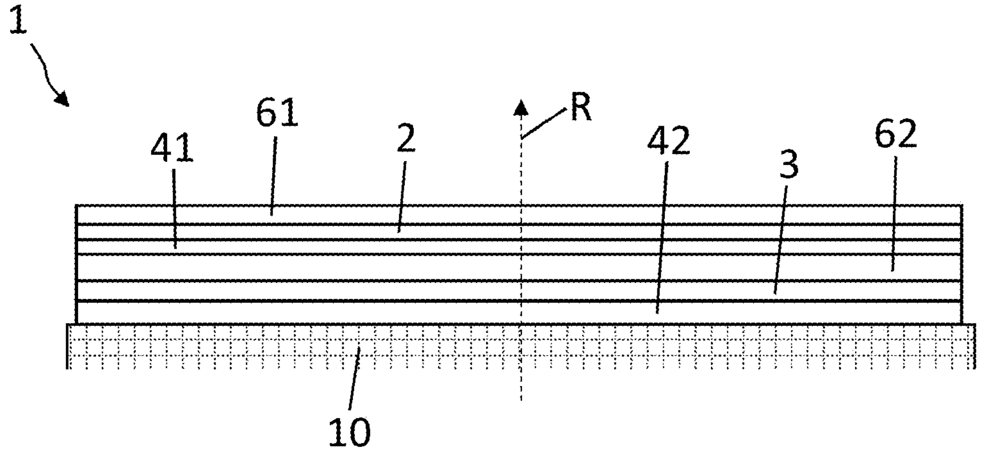
Figure 7:
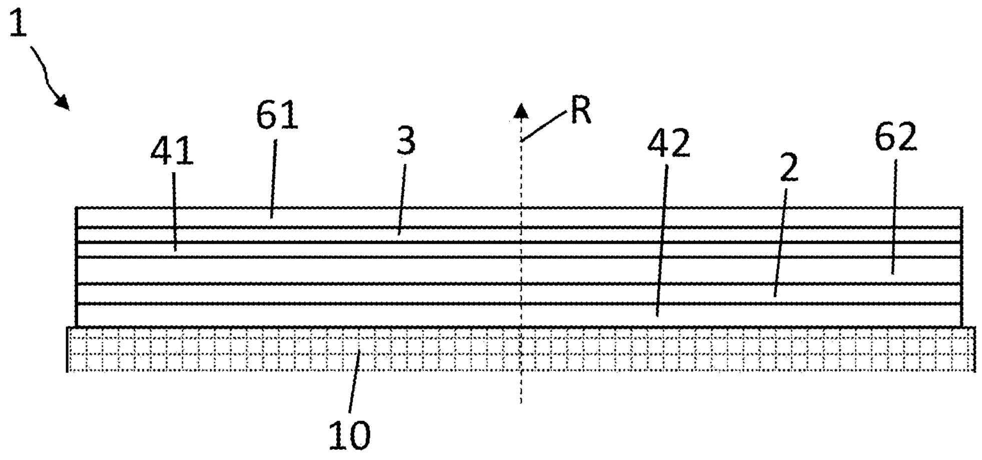

FIG. 6 shows a further embodiment of the multifunctional label 1, which has a first and a second print layer or coating 61 and 62. The first print layer 61 can be applied as printing and/or coating on a UV protective film, which realizes the radiation protection layer 2. The first print layer 61 is designed as the uppermost layer and can provide information and/or additional protection against UV radiation and/or visible light. The second print layer 62 is arranged within the layer stack of the multifunctional label 1 and can be formed analogously as printing and/or coating on the gas barrier layer 3 in order to provide information and/or additional protection against UV radiation and/or visible light. The gas barrier layer 3 and the inner second print layer 62 are protected against external mechanical influences by the radiation protection layer 2.

FIG. 7 illustrates again that the positions of the radiation protection layer 2 and the gas barrier layer 3 can vary with respect to the stacking direction R. The first printing layer 61 can rest on the gas barrier layer 3, while the second printing layer 62 is arranged on the radiation protection layer 2. Thus, the radiation protection layer 2 and the inner second print layer 62 are now protected against mechanical influences from the outside by the gas barrier layer 3.

Figure 8:
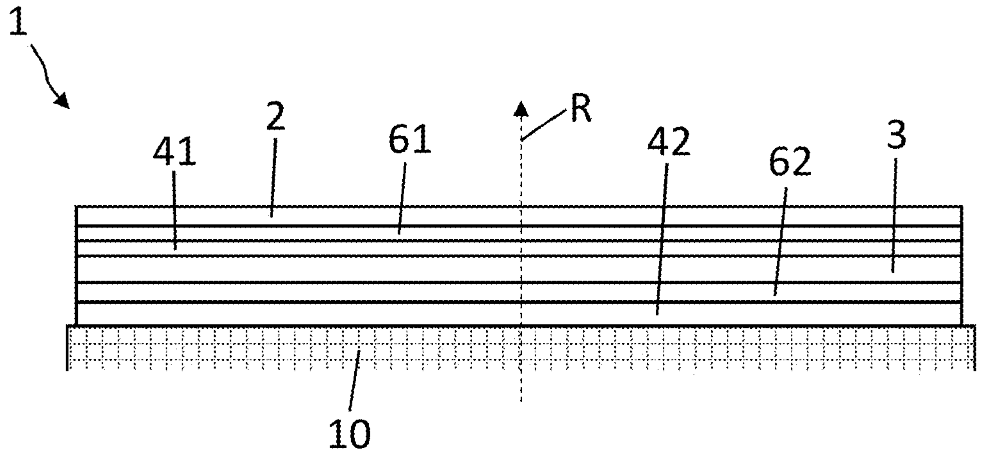

FIG. 8 shows a further embodiment of the multifunctional label 1, in which the first and second print layers 61 and 62 are formed on a respective underside of the radiation protection layer 2 and the gas barrier layer 3. A printing and/or coating can therefore be formed on a respective inner side and/or a respective outer side of the radiation protection layer 2 and the gas barrier layer 3 with respect to the stacking direction R.

FIGS. 9-12 show further embodiments of the multifunctional label 1, which further comprises an inspection window 8 and/or is set up to form such an inspection window 8. The inspection window 8 allows an unobstructed view into the container or into the object 10, which is realized, for example, as a transparent plastic syringe. The multifunctional label 1 thus provides reliable combination protection against UV radiation and/or light and also a useful option for true color inspection.

Figure 9:
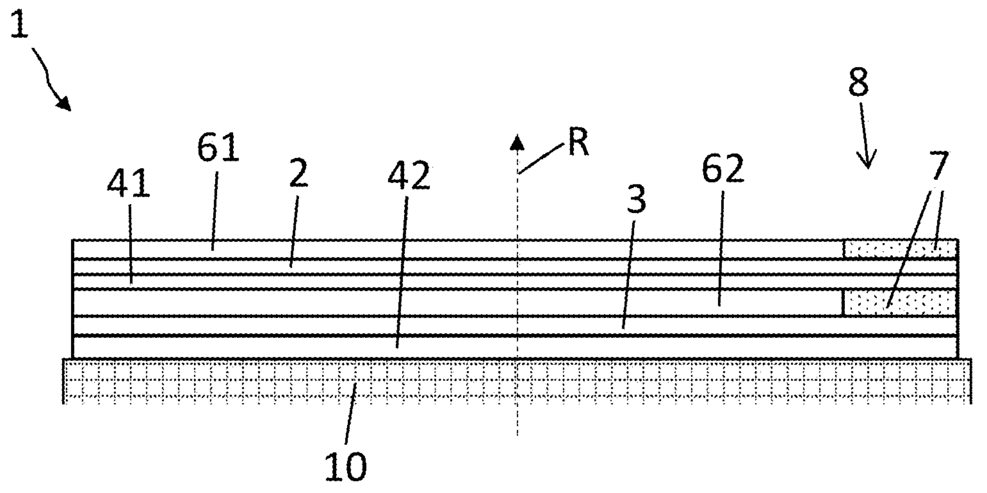

According to FIG. 9, the multifunctional label 1 again has two print layers 61 and 62, but these do not completely cover the radiation protection layer 2 or the gas barrier layer 3, so that the radiation protection layer 2 and the gas barrier layer 3 each have a print-free or coating-free area 7. Thus, a layered structure of the multifunctional label 1 is designed with transparent areas in each layer that allow a direct, uninfluenced view into the object 10. The radiation protection layer 2 and the gas barrier layer 3 can be designed in particular as transparent film or foil elements or alternatively be transparent at least in the pressure-free areas 7, so that a transparent viewing window is created.

Figure 10:
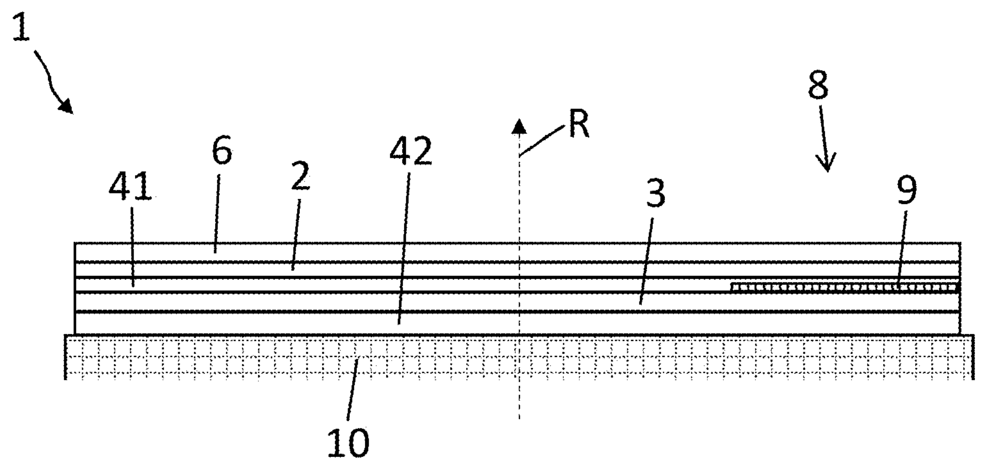

According to FIG. 10, the multifunctional label 1 has an adhesive weakening agent 9 for forming the inspection window 8, which is specifically introduced at an edge position in the area of the first adhesive layer 41. The adhesive weakening agent 9 can be coated as an area with modified surface energy, for example in sections with silicone, in order to reduce the adhesion of the first adhesive layer 41 in a controlled manner, so that the overlying layers can be detached or lifted off from the layers below. Alternatively or additionally, the adhesive weakening agent 9 can be incorporated as an area with an imprint and/or a coating in the layer stack of the multifunctional label 1, which neutralizes or predetermined weakens the adhesive of the first adhesive layer 41. Alternatively, an area under the radiation protection layer 2 or on the gas barrier layer 3 can remain free of adhesive, so that the first adhesive layer 41 according to FIG. 10 does not completely cover the underside of the radiation protection layer 2 or the upper side of the gas barrier layer 3. The adhesive weakening agent 9 can therefore also be realized as an adhesive-free area and reduce an overall adhesive force of the first adhesive layer 41 compared to an adhesive layer that would completely cover one side of the radiation shielding layer 2 or the gas barrier layer 3.

By means of the adhesive weakening agent 9, a partial delamination of the layer stack of the multifunctional label 1 is set up in order to enable a real color check of the contents of the object 10. In particular, the delamination can be reversible. The partial delamination partially divides a functional layer stack into an inner and outer section in relation to the stacking direction R. According to FIG. 10, the print layer 6 and the radiation protection layer 2 form the outer part or section, while the gas barrier layer 3 forms the inner part or section. For a true-color inspection, it is useful that the inner part has sufficiently transparent areas to allow an unobstructed, uninfluenced view into the object 10. Because the gas barrier layer 3 is assigned to the inner part of the layer stack, its barrier layer functionality is retained even if the outer part of the layer stack is partially delaminated for inspection purposes.

Figure 11:
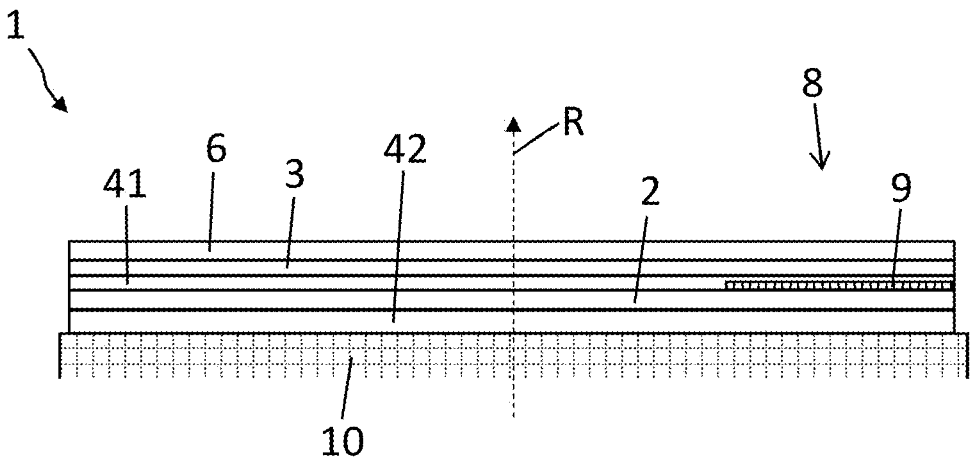

In the embodiment shown in FIG. 11, the position of the radiation protection layer 2 and the gas barrier layer 3 in the multifunctional label 1 is swapped compared to FIG. 10, so that the inner part of the layer stack now contains the UV protection film or the radiation protection layer 2. This means that the radiation protection is still provided even if the upper part of the multifunctional label 1 with the gas barrier layer 3 is partially folded up for testing purposes.

Figure 12:
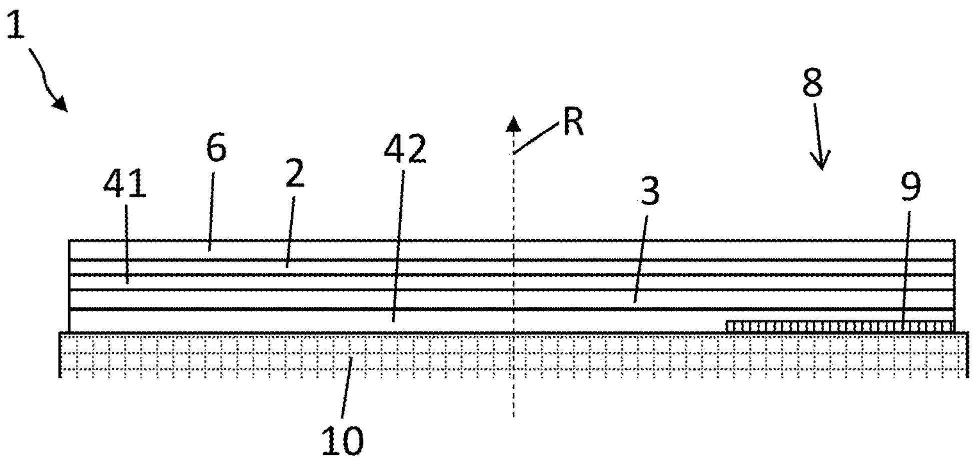

FIG. 12 illustrates a further embodiment for integrating the inspection window 8 in the multifunctional label 1 and enabling a true-color inspection of the contents in the object 10. The adhesive weakening agent 9 is introduced in the area of the lowest adhesive layer 42, which connects the multifunctional label 1 to the object 10. This enables partial removal of the entire stack of layers from the container surface, which can be reversible in particular. The adhesion between the stack of layers of the multifunctional label 1 and the surface of the container or object 10 is specifically weakened in an edge area where the partial removal is to take place. This can be realized, for example, by printing or coating the surface or a surface section of the object 10 intended for this purpose with silicone and/or by printing the second adhesive layer 42 between the inner layer or the gas barrier layer 3 and the surface of the object 10.

Figure 13:
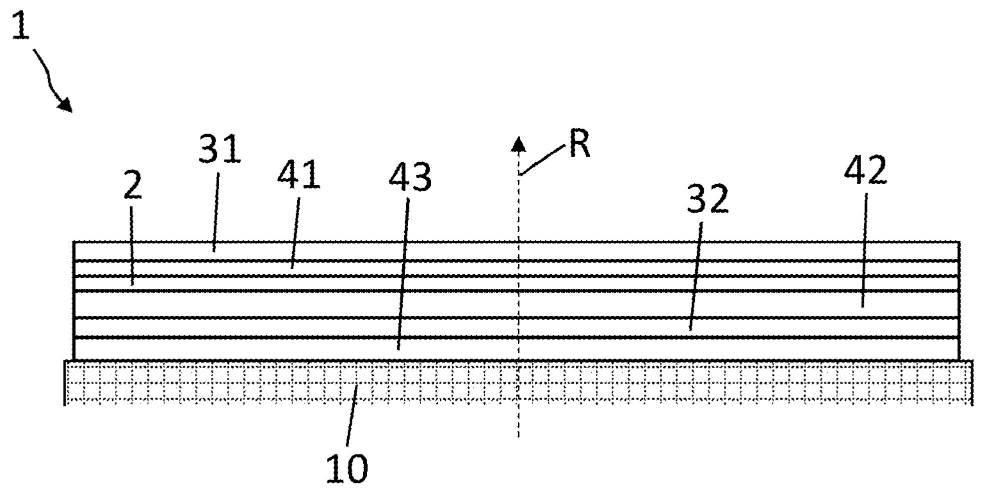
Figure 14:
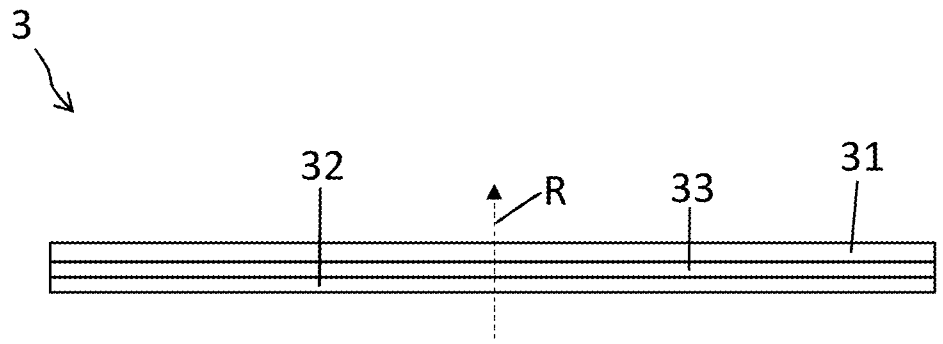

FIG. 13 shows a further embodiment of the multifunctional label 1, in which the gas barrier layer 3 comprises several layers. FIGS. 14 and 15 illustrate further possibilities for multilayer structures of the gas barrier layer 3. Accordingly, the gas barrier layer 3 can, for example, have a barrier film or comprise several barrier films. According to FIG. 13, a first barrier layer 31 and a second barrier layer 32 can be incorporated separately from one another in the layer stack of the multifunctional label 1. The first barrier layer 31 and the second barrier layer 32 are thus arranged separately within the layer stack and are coupled to one another by means of the first adhesive layer 41, the radiation protection layer 2 and the second adhesive layer 42. The multifunctional label 1 is attached to the object 10 by means of the third adhesive layer 43. The two barrier layers 31 and 32 form sections of a multilayer stack and can have an advantageous effect on a barrier performance against a passage of oxygen and reduce a risk of a loss of performance due to material defects.

The two barrier layers 31 and 32 may be arranged on the inside and outside of the radiation protection layer 2, as shown in FIG. 13. The inner, second barrier layer 32 forms the lowest part of the gas barrier layer 3 and also protects against migration through the outer layers of the multifunctional label 1. The outer, first barrier layer 31 forms the upper part of the gas barrier layer 3 and also protects the inner layers of the multifunctional label 1 against mechanical influences.

Alternatively or additionally, several layer elements of the gas barrier layer 3 can also be joined together, as shown in FIGS. 14 and 15. The barrier layers 31 and 32 can be attached to each other as film elements by means of a barrier adhesive layer 33 in the form of a pressure-sensitive adhesive and/or by welding. The stacking of several barrier films leads to improved barrier properties of the gas barrier layer 3 and a lower risk of performance losses due to material defects within the individual barrier layers 31, 32. In the case of several barrier layers 31, 32, the barrier films can be printed and/or coated to add information or additional UV and/or light protection (see FIG. 15).

FIG. 16 schematically shows a flowchart for a method for producing one embodiment of the multifunctional label 1.

In a step S1, the radiation protection layer 2 is provided, for example in the form of a pigmented and/or printed film.

In a further step S2, the gas barrier layer 3, for example in the form of a silicon oxide carrier film with coating, is provided.

Steps S1 and/or S2 can also be set up so that one of radiation protection layer 2 and gas barrier layer 3 is applied, printed or formed on the other. For example, the gas barrier layer 3 may be provided as a coated film element to which a UV varnish is applied to form and provide the radiation protection layer 2. Alternatively, for example, the radiation protection layer 2 may be provided as a pigmented and/or printed film element on which a silicon oxide layer is vapor-deposited to form and provide the gas barrier layer 3. In addition, several radiation protection layers 2 and/or gas barrier layers 3 or barrier layers 31, 32 can be formed and/or provided.

In a further step S3, the radiation protection layer 2 and gas barrier layer 3 are coupled to each other, unless they are formed on top of each other as described above and are therefore already coupled to each other. In each case, a common multifunctional label 1 is formed, in which the radiation protection layer 2 and the gas barrier layer 3 are directly or indirectly connected to each other.

Optionally, in a step S4, the mechanical protective layer 5, the print layer or coating 6 and/or one or more adhesive layers 41, 42, 43 and/or intermediate layers can be introduced into the multifunctional label 1. A sequence of the manufacturing process does not necessarily have to correspond to the illustrated and numbered sequence of steps.

By means of the described embodiments of the multifunctional label 1, reliable and durable protection for pharmaceutical products can be realized in a simple and cost-effective manner. In particular, the combination of a layer stack of a light and/or UV protection film and a gas barrier film together with an inspection window 8 or the use of printed light and/or UV protection layers in the layer stack of the multifunctional label 1 enable a variety of useful label functionalities.

REFERENCE SIGNS

1 multifunctional label
2 radiation protection layer
3 gas barrier layer
31 first barrier layer
32 second barrier layer
33 adhesive barrier layer
4 adhesive layer
41 first adhesive layer
42 second adhesive layer
43 third adhesive layer
5 mechanical protective layer
6 print layer/coating
61 first print layer/coating layer

62 second print layer/coating layer
7 pressure-free/coating-free area
8 inspection window
9 adhesive weakening agent
10 object
R stacking direction of the label
S(i) steps of a method for producing a multifunctional label

The invention claimed is:

1. A multifunctional label (1), comprising:

a radiation protection layer (2) which is configured to predeterminedly reduce a transmission of electromagnetic radiation in an ultraviolet and/or visible spectral range, a gas barrier layer (3) which is formed as a transparent film element, at least in sections, and configured to reduce a transmission of a gaseous substance in a predetermined manner, an adhesive layer (4, 41, 42, 43) which couples the radiation protection layer (2) to the gas barrier layer (3), and an adhesive weakening agent (9), which is arranged between the radiation protection layer (2) and the gas barrier layer (3), so that the adhesive layer (4, 41, 42, 43) is predeterminedly weakened in sections and the radiation protection layer (2) and the gas barrier layer (3) can be detached from one another in sections and can be bonded to one another again.

2. The multifunctional label (1) according to claim 1, wherein the radiation protection layer (2) is designed as a film which predeterminedly reduces the transmission of ultraviolet radiation and/or visible light.

3. The multifunctional label (1) according to claim 1, further comprising a film layer in addition to the radiation protection layer (2), the gas barrier layer (3), and the adhesive layer (4, 41, 42, 43);

wherein the gas barrier layer (3) is formed on the film layer by vapor deposition and/or printing; or wherein the film layer comprises a carrier element and the gas barrier layer (3) is formed on the carrier element by vapor deposition and/or printing.

4. The multifunctional label (1) according to claim 1, wherein the radiation protection layer (2) is designed as a lacquer layer which predeterminedly reduces the transmission of ultraviolet radiation and/or visible light.

5. The multifunctional label (1) according to claim 1, wherein the gas barrier layer (3) comprises silicon oxide and/or aluminum oxide and is adapted to predeterminedly reduce a transmission of oxygen or an oxygen-containing gas mixture.

6. The multifunctional label (1) according to claim 1, wherein the radiation protection layer (2) comprises pigments which are adapted to absorb and/or reflect a predetermined ultraviolet radiation and/or comprises a color print which is adapted to absorb and/or reflect a predetermined wavelength range of visible light.

7. The multifunctional label (1) according to claim 1, wherein the radiation protection layer (2) and the gas barrier layer (3) are at least partially transparent for a predetermined wavelength range of visible light.

8. The multifunctional label (1) according to claim 1, further comprising:

a print layer or coating (6, 61, 62) which is coupled to the radiation protection layer (2) and/or the gas barrier layer (3), wherein the print layer or coating (6, 61, 62) covers the radiation protection layer (2) and/or the gas barrier layer (3) only in predetermined sections, so that the radiation protection layer (2) and/or the gas barrier layer (3) are transparent to a predetermined wavelength range of visible light in predetermined sections.

9. The multifunctional label (1) according to claim 1, further wherein the gas barrier layer (3) is transparent and comprises a first barrier layer (31), a second barrier layer (32) and a barrier adhesive layer (33), which adhesively couples the first and second barrier layers (31, 32) to one another.

10. The multifunctional label (1) according to claim 9, wherein the adhesive layer (4, 41, 42, 43) and/or the barrier adhesive layer (33) are formed as a pressure-sensitive adhesive layer.

11. The multifunctional label (1) according to claim 1, wherein the adhesive layer comprises a first adhesive layer (41), which is arranged between the radiation protection layer (2) and the gas barrier layer (3) with respect to a stacking direction (R) of the multifunctional label (1) and adhesively couples the radiation protection layer (2) and the gas barrier layer (3) to each other, and wherein the multifunctional label (1) further comprises a second adhesive layer (42) which is bonded to the radiation protection layer (2) or to the gas barrier layer (3) and which is configured to adhesively couple the multifunctional label (1) to an object (10).

12. A system, comprising:

an object (10), and the multifunctional label (1) according to claim 1, which is coupled to the object (10).

13. A method of manufacturing a multifunctional label (1), comprising:

providing a radiation protection layer (2) which is configured to predeterminedly reduce a transmission of electromagnetic radiation in an ultraviolet and/or visible spectral range, providing a gas barrier layer (3) which is formed as a transparent film element, at least in sections, and configured to predeterminedly reduce a transmission from a gaseous substance, coupling the radiation protection layer (2) and the gas barrier layer (3) to one another using an adhesive layer (4, 41, 42, 43), and arranging an adhesive weakening agent (9), between the radiation protection layer (2) and the gas barrier layer (3), so that the adhesive layer (4, 41, 42, 43) is predeterminedly weakened in sections and the radiation protection layer (2) and the gas barrier layer (3) can be detached from one another in sections and can be bonded to one another again.

* * * * *